US006829965B1

(12) United States Patent
Mombrinie

(10) Patent No.: US 6,829,965 B1
(45) Date of Patent: Dec. 14, 2004

(54) TWO-PIECE BICYCLE CRANK SET

(76) Inventor: Bruno Mombrinie, 2517 Copperfield Dr., Santa Rosa, CA (US) 95401

( * ) Notice: Subject to any disclaimer, the term of this patent is extended or adjusted under 35 U.S.C. 154(b) by 0 days.

(21) Appl. No.: 09/692,083

(22) Filed: Oct. 19, 2000

Related U.S. Application Data

(63) Continuation-in-part of application No. 09/580,336, filed on May 26, 2000, now abandoned.
(60) Provisional application No. 60/136,669, filed on May 28, 1999.

(51) Int. Cl.$^7$ ................................................. G05G 1/14
(52) U.S. Cl. ...................................................... 74/594.2
(58) Field of Search ............................. 74/594.1, 594.2, 74/594.3; 384/545, 458; 280/259

(56) References Cited

U.S. PATENT DOCUMENTS

| | | | |
|---|---|---|---|
| 529,110 A | 11/1894 | Copeland | |
| 535,706 A | 3/1895 | Luther | |
| 573,779 A | 12/1896 | Gillespie | |
| 593,562 A | 11/1897 | Brennan | |
| 596,562 A | 1/1898 | Brown | |
| 658,624 A | 9/1900 | Egger | |
| 846,239 A | * 3/1907 | Osburne | 74/594.2 |
| 951,137 A | * 3/1910 | Lowrance | 384/458 |
| 4,171,822 A | 10/1979 | Thun | 280/259 |
| 4,704,919 A | 11/1987 | Durham | 75/594.1 |
| 4,793,208 A | 12/1988 | Bregnard et al. | 74/594.2 |
| 4,811,626 A | 3/1989 | Bezin | 74/594.1 |
| 5,010,785 A | 4/1991 | Romero | 74/594.1 |
| 5,179,873 A | 1/1993 | Girvin | 74/594.1 |
| 5,263,351 A | * 11/1993 | Berg, III | 72/208 |
| 5,493,937 A | 2/1996 | Edwards | 74/594.1 |
| 5,924,336 A | 7/1999 | Richardson | 74/594.1 |
| 5,988,016 A | 11/1999 | Yamanaka | 74/594.2 |
| 6,022,054 A | * 2/2000 | Hemphill et al. | 285/398 |
| 6,164,157 A | 12/2000 | Chen | 74/594.1 |
| 6,314,834 B1 | * 11/2001 | Smith et al. | 74/594.1 |
| 6,352,485 B1 | * 3/2002 | Philpot et al. | 473/564 |

FOREIGN PATENT DOCUMENTS

| | | |
|---|---|---|
| DE | 56513 | 11/1912 |
| GB | 12265 | 7/1895 |

OTHER PUBLICATIONS

Andrews, N., "A Folding MWB Two–Wheeled Recumbent", *Human Power*, vol. 11/2, pp. 18–21 (Spring–Summer 1994).
Performance ® Elite ™ Early Summer 1998 catalog, ZIPP carbon Fiber ATB Crankarm on p. V.

* cited by examiner

*Primary Examiner*—David A. Bucci
*Assistant Examiner*—Vicky A. Johnson
(74) *Attorney, Agent, or Firm*—Charles N. Quinn

(57) ABSTRACT

The present invention is a two-piece bicycle crank set comprising of two monolithic, thin-wall continuous tubular members. Each tubular member includes a crank arm and a one-half portion of a crank axle, where the crank arm and the portion of the crank axle form a continuous thin-wall tubular shape. The two tubular members are coupled precisely midway between two bearing sets within a bracket shell of a bicycle. The coupling connecting the two tubular members can include an outer sleeve, an inner sleeve, two exteriorly tapered and internally threaded bushings and a threaded stud. Turning the threaded stud positions the bushings to expand the inner sleeve, whereby the crank axle portions of the two tubular members are secured within the inner sleeve and the outer sleeve by the expanding inner sleeve. Alternatively, an interference fit coupling connects the two tubular members, and includes a mortise member and a tenon member. The tenon member fits into and interlocks within the mortise member to secure the first tubular member to the second tubular member. The interference fit coupling can further include an attachment bolt and a separation bolt to facilitate assembly and disassembly of the coupling.

13 Claims, 14 Drawing Sheets

TWO-PIECE BICYCLE CRANK SET

RELATED APPLICATIONS

This application is a continuation-in-part (CIP) of applicant's U.S. patent application Ser. No. 09/580,336, filed May 26, 2000 now abandoned, entitled "Two-Piece Bicycle Crank Set," which application claims priority to U.S. Provisional Patent Application No. 60/136,669, filed May 28, 1999, entitled "Two-Piece Bicycle Crank Set." The above referenced patent applications are incorporated in their entirety herein by this reference.

FIELD OF THE INVENTION

The present invention relates generally to a bicycle crank set assembly, and more particularly to a two-piece, tubular, continuous and tapered crank set combining high strength with light weight.

BACKGROUND OF THE INVENTION

In bicycle racing, the weight, strength, and rigidity of bicycle components are of ultimate importance to bicycle enthusiasts. Lighter components (especially the rotating parts) having superior strength and rigidity are much sought after.

Information relevant to attempts to address these component characteristics can be found in the following U.S. Pat. No. 5,493,937 to Edwards; U.S. Pat. No. 4,704,919 to Durham; and U.S. Pat. No. 5,924,336 to Richardson. However, each of these references suffers from one or more of the disadvantages described below. Therefore, these references do not effectively combine maximum load bearing capability with minimum weight.

Many existing bicycle crank sets include a two-piece crank axle having intricately joined crank arms. The crank arms are often separate members mechanically attached to the crank axle portions and sometimes reinforced with gussets. The mechanical attachments and reinforcing gussets undesirably result in a build up of weight at the attachment locations.

The present invention solves this problem by providing a continuous tubular member of monolithic design, combining a one-half crank axle portion with a crank arm. This design avoids weighty joint and joint reinforcements, efficiently providing superior strength and rigidity while minimizing weight.

Many existing crank sets include crank arms having a constant cross-section along the crank arm length. Since bearing loads addressed by crank arms are not constant over the crank arm length, a crank arm having a constant cross-section does not offer superior load carrying capabilities in relation to weight, thus being detrimental to achieving a maximum strength and rigidity to weight relationship.

The present invention provides tapered crank arms, analyzed for load bearing capacity at each point along the crank arm length. This design efficiently provides the minimal cross-section necessary, at each point along the crank arm length, to accommodate the loads faced at each point along the crank arm length. The monolithic and continuous design distributes all stresses uniformly and equally over each piece of the crank set.

Some existing crank sets join two crank axle portions within a bracket shell with a spline joint. Due to the nature of cyclical loads bearing on the crank axle, the weakest portion of the crank axle occurs at its smallest diameter, or at a stress concentration point. Since a spline joint joins one smaller diameter crank axle portion within another larger diameter crank axle portion, the overall crank axle bearing capacity is limited to its smaller diameter portion. Considering the limited dimensions of the bracket shell, the spline joint does not offer maximum load bearing capacity relative to overall crank axle diameter.

The present invention provides a uniform crank axle diameter of tubular design, efficiently maximizing load bearing capacity relative to crank axle diameter.

Existing crank sets having larger diameter crank axles with excessively reinforced and weighty couplings further require larger and heavier bearing sets or bearing set placement outside the bracket shell (as in Richardson). Since the boundary conditions of the bracket shell are fixed, larger bearing sets result in less space to accommodate large diameter crank axles. Therefore, there exists a need for bearing sets made of higher strength materials, so that smaller bearing sets could accommodate the crank axle loads. These smaller bearing sets would offer more space within a typical bracket shell for larger diameter crank axles, thus increasing crank axle bearing capacity without resorting to bearing set placement outside the bracket shell, which has the disadvantage of widening the crank set assembly.

The present invention solves this problem by providing high strength bearing sets of a diameter substantially smaller than that in existing crank sets, thus accommodating crank axles of larger diameter within the fixed diameter of the bracket shell and providing a crank set of superior load bearing capacity.

SUMMARY OF THE INVENTION

The present invention is a directed to a two-piece bicycle crank set combining superior strength and rigidity with light weight. The crank set comprises two thin-wall tubular members. The tubular members include crank axle portions of relatively large diameter and light weight, tapered crank arms where torsional, bending and shear loads determine the tubular cross sectional size at each location along the crank arm length and a reinforcing insert at the distal end of the crank arm to accommodate a variety of pedal axles, or a tubular pedal axle incorporated within the continuous, monolithic crank axle and crank arm tubular member.

In one aspect of the present invention, the crank set is significantly lighter than existing crank set assemblies and has superior load bearing capability. The crank set is designed with torsional, bending and shear loads determining the dimensions of the tubular crank axle and the tapered crank arm cross-section. The tubular members are designed and shaped to distribute all stresses uniformly and equally over the continuous tubular member.

In one aspect of the present invention, the crank set includes bearing sets having ultra high strength ball bearings allowing for smaller bearing sets than those found in existing crank set assemblies, therefore providing additional space within the bracket shell for a larger diameter crank axle.

In another aspect of the present invention, the crank set is split midway along its crank axle, with each crank set piece containing precisely one-half of the total crank axle length. The two, one-half crank axle portions are coupled within the bracket shell precisely midway between the two bearing sets. Connecting the crank axle portions precisely midway between the two bearing sets effectively eliminates all shear loads.

In another aspect of the present invention, the bicycle crank set comprises a first tubular member, a second tubular member, a spider connected to the second tubular member, and a coupling securing the first tubular member to the second tubular member within a bracket shell. The first and the second tubular members include a crank arm and a portion of a crank axle forming a continuous and monolithic thin-wall tubular shape.

In another aspect of the present invention, the first and the second tubular members further include a pedal axle, where the crank arm, the portion of the crank axle and the pedal axle all form a continuous and monolithic thin-wall tubular shape. In another of its aspects, a spider is further incorporated into the continuous, thin-wall tubular shape of the second tubular member.

In another aspect of the present invention, the first and the second tubular members are injection molded and made of aramid fiber composite material. Alternatively, the first and the second tubular members could be injection molded and made of carbon and glass fiber composite material. Further, the first and the second tubular member could be steel stamped parts of clamshell design and electron beam or laser welded together to form the continuous and monolithic thin-wall tubular shape.

In another aspect of the present invention, the coupling includes an outer sleeve, an inner sleeve, two exteriorly tapered and internally threaded bushings, and a threaded stud. Turning the stud threadably positions the bushings to expand the inner sleeve, securing the crank axle portions of the first and the second tubular members between the inner and the outer sleeves of the coupling.

In another aspect of the present invention, the coupling includes a mortise member and a tenon member. The tenon member fits into the mortise member to secure the crank axle portion of the first tubular member to that of the second tubular member. This coupling can further include an attachment bolt that passes through a clearance hole in one of the tubular members and threadably engages an attachment hole in the other tubular member. Threading the attachment bolt into the attachment hole securely interlocks the tenon member into the mortise member. The mortise and the tenon members can be either tapered or non-tapered. This coupling can further include separation bolt, where removing the attachment bolt and threading the separation bolt into and through the clearance hole forces the tenon member apart and away from the mortise member.

In another aspect of the present invention, the clearance hole has a diameter of 10 mm and the attachment hole has a diameter of 8 mm. The diameter of the attachment bolt can be 8 mm and the diameter of the separation bolt can be 10 mm.

In another aspect of the present invention, the tenon and the mortise members are made of boron composites. Alternatively, the tenon and the mortise members can be made from high strength metal materials.

In another aspect of the present invention, the crank set further includes two bearing sets and the coupling within the bracket shell is located precisely midway between the two bearing sets. The bearing sets can include an outer cup, an inner cup, seals and ceramic balls. The ceramic balls can housed within the outer cup, the inner cup and the seals and can be separated from one another by retainers. The outer cup is in communication with the bracket shell and the inner cup is in communication with the crank axle portion of one of the tubular members. The ceramic balls can be made of silicon nitride. The outer and the inner cups can be made of 52100 steel and can be hardened and sputer coated with titanium aluminum nitride to provide an overall hardness exceeding Rockwell 90. The seals can be spring loaded Teflon garter. The retainers can be made of mylar, nylon, Delrin or an adequate engineering plastic.

In another aspect of the present invention, the crank arm further includes an internally threaded titanium insert capable of housing a variety of pedals. The crank arm can include a compression molded solid carbon fiber and glass composite portion, in the vicinity of the titanium insert, to house the titanium insert.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
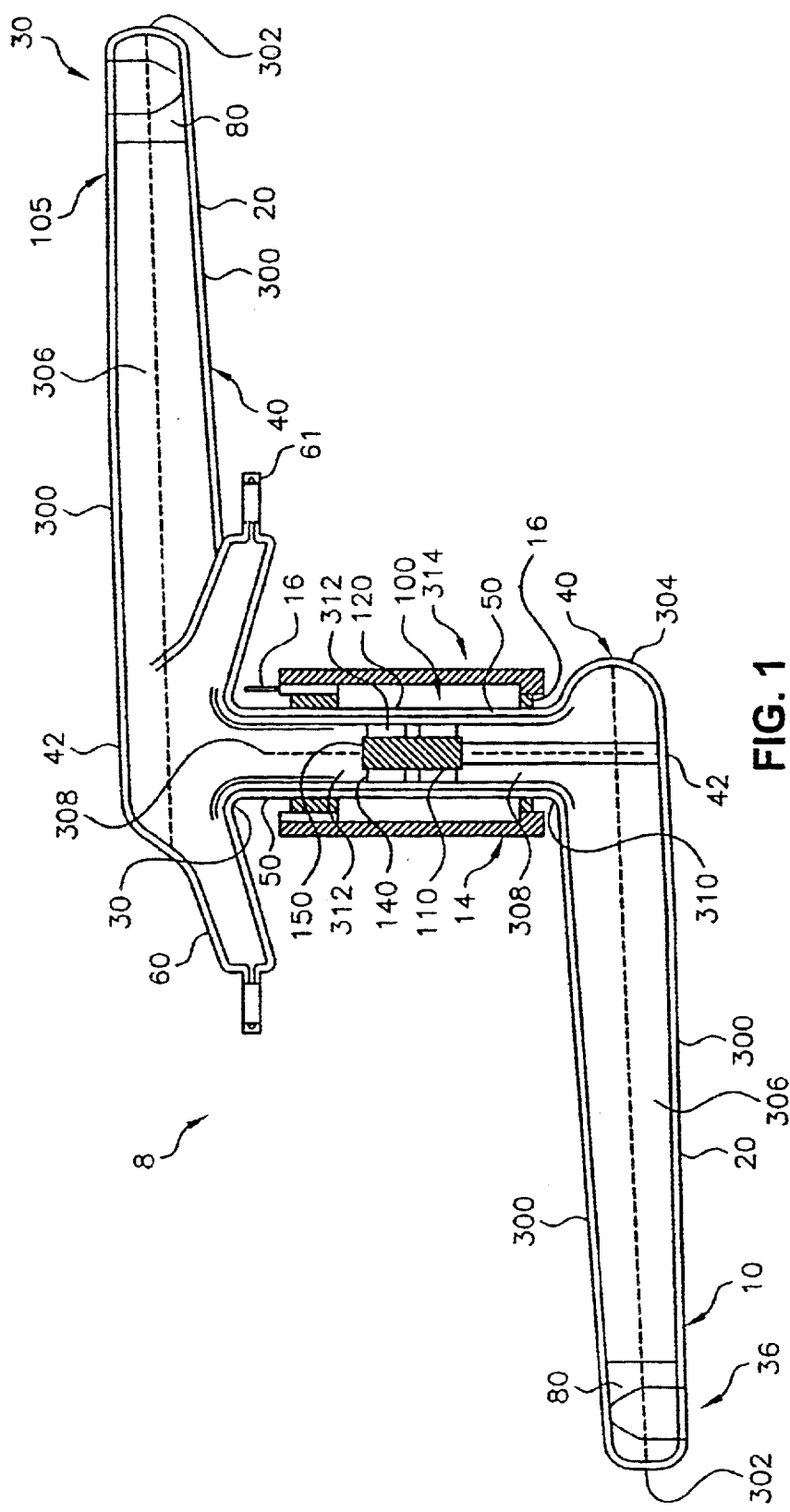
FIG. 1 illustrates a top, cross-sectional view of a two-piece crank set coupled within a bracket shell, in accordance with the present invention.
Figure 7:
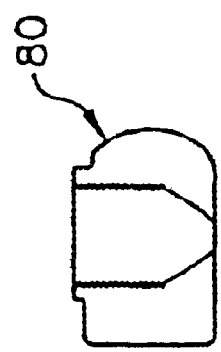
FIG. 7 illustrates a side, cross-sectional view of a reinforcing insert used to support a pedal axle, in accordance with the present invention.

Referring now to the drawings, wherein like numerals indicate like elements, there is shown in the drawings in general, and in FIG. 1 in particular, a two-piece bicycle crank set 8, comprising two, continuous thin-wall tubular members 10, each tubular member 10 including a continuous crank arm 40, a one-half crank axle 50, and a reinforcing pedal axle insert 80. The crank arms 40 are tapered. The reinforcing inserts 80 (detailed in FIG. 7), inserted in the distal end of the crank arm 40, are solid core and include a standard interior thread within pedal axle aperture 30, allowing for attachment of a variety of pedals (not shown). The drive side continuous tubular member 10 further includes a spider 60, on which chain gears are mounted (not shown).

The two continuous tubular members 10 each contain a crank axle 50 portion precisely equaling one-half of the total crank axle length of the crank set 8. Therefore, the connection between the tubular members 10 is centrally located between two bearing sets 16 within a bracket shell 14. Other embodiments may have the tubular members 10 containing other than precisely one-half of the crank axle, meaning the connection between the tubular members 10 is not centrally located between the two bearing sets 16 within the bracket shell 14.

Figure 2:
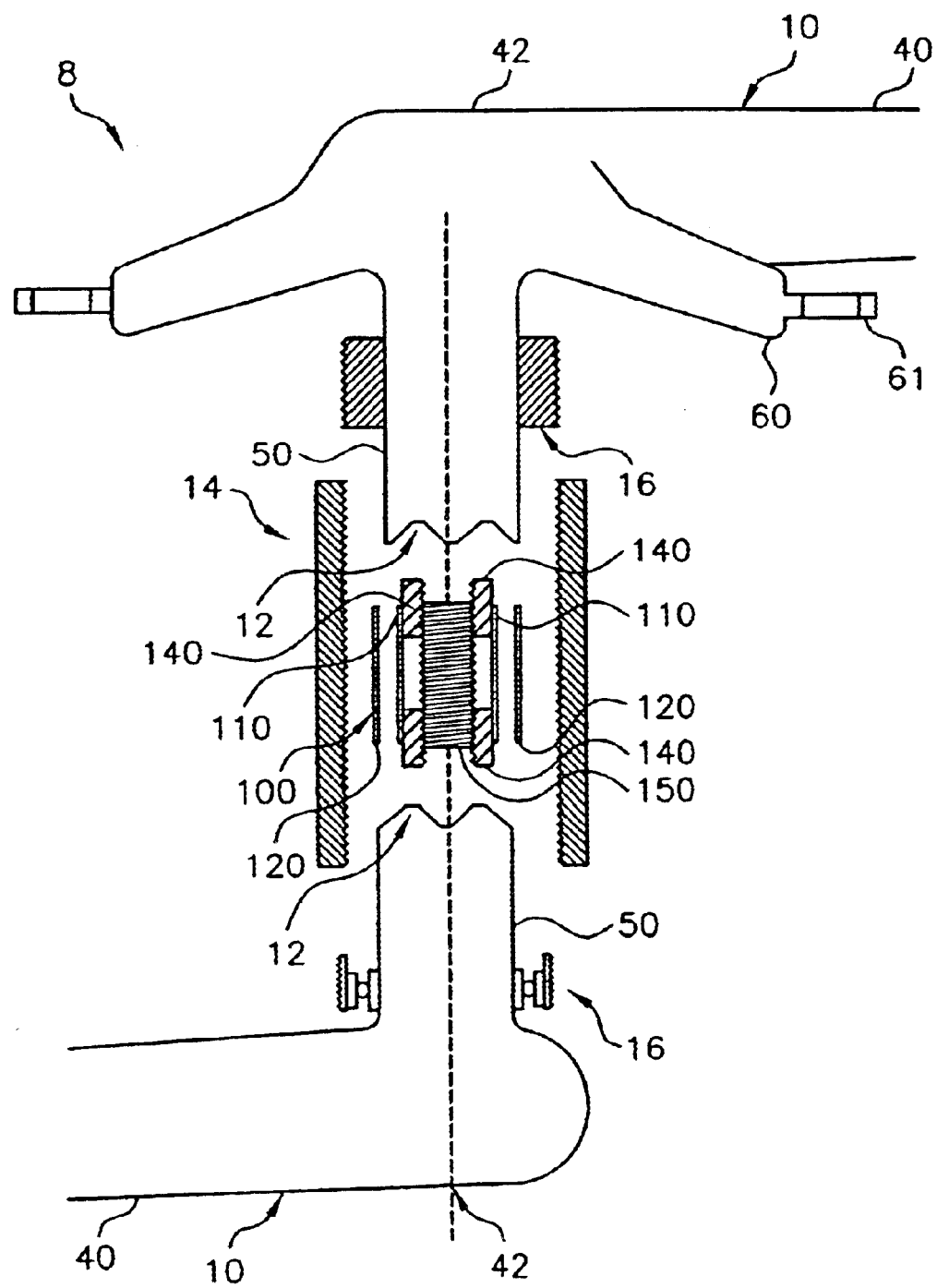
FIG. 2 illustrates a top, cross-sectional exploded view detailing the crank set housing shown in FIG. 1.

Referring to FIG. 2, each continuous tubular member 10 of this embodiment has a convoluted split 12. When the continuous tubular members 10 are brought together in a mating position, the crank arms 40 are located 180° from each other. Thus, the torque from one crank arm 40 is transmitted to the other crank arm 40.

Figure 5:
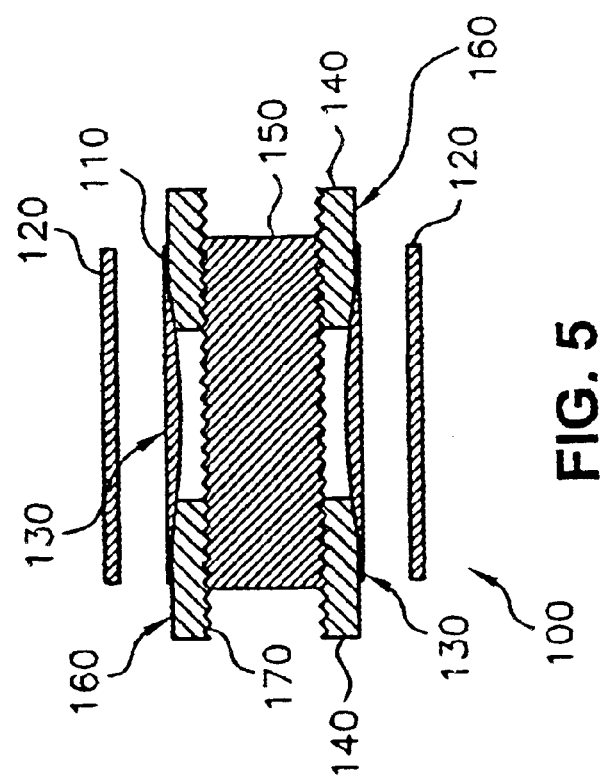
FIG. 5 illustrates a top, cross-sectional exploded view of a coupling portion of the crank set shown in FIG. 1, with bushings in an non-operational position.

A sleeved coupling 100 secures the two continuous tubular members 10 together. The convoluted split 12 attachment of the two, one-half crank axles 50 are sandwiched between an inner sleeve 110 and an outer sleeve 120 of the sleeved coupling 100, as shown in FIGS. 2 and 5. The inside diameter 130 of the inner sleeve 110 is conically tapered from its mid-section to its outer edges.

Figure 6:
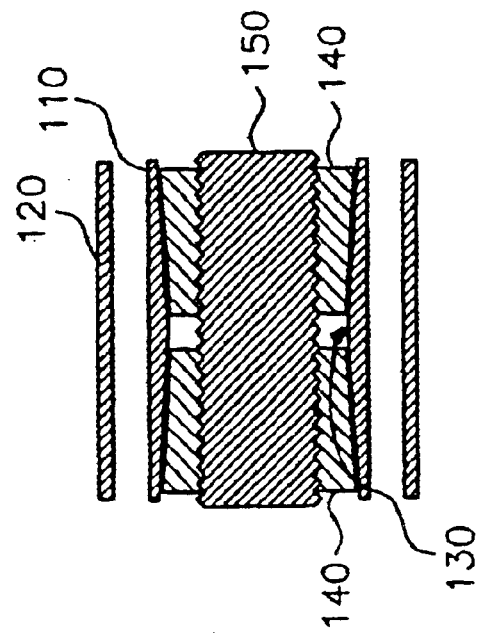
FIG. 6 illustrates a top, cross-sectional exploded view of the coupling shown in FIG. 5, with the bushings in an operational position.

Two matching bushings 140, having outside diameters 160 exteriorly tapered to accommodate the conically tapered inside diameter 130 of the inner sleeve 110, are placed in each end of the inner sleeve 110. When the bushings 140 are drawn together, as shown in FIG. 6, they expand the inner sleeve 110, squeezing the one-half crank axles 50 against the outer sleeve 120. The bushings 140 are threaded on their inside diameter 170, and are drawn together on a threaded stud 150. One bushing 140 is threaded right-handed and the other bushing 140 is threaded left-handed. The threaded stud 150 is reversed threaded at each end to match the bushings 140 and to allow both bushings 140 to come together on the stud 150 by turning the stud 150. Turning the stud 150 one way forces the bushings 140 together, securing the one-half crank axles 50 to the outer sleeve 120. Turning the stud 150 the opposite way releases separates bushings 140, releasing the one-half crank axles 50 from secure attachment to the outer sleeve 120.

Figure 8:
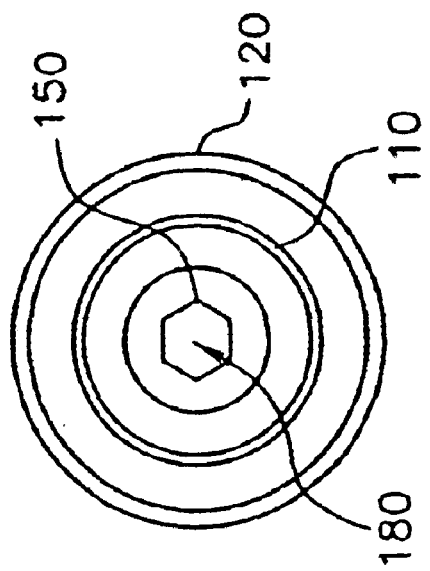
FIG. 8 illustrates a side elevation view of the coupling shown in FIG. 5, without including the bushings.

The stud 150 has a hexagonal hole 180 extending through its length, as shown in FIG. 8. The stud 150 is turned with a matching hex key wrench inserted into the hole 180 (not shown).

This design provides several advantages for bicycle crank set assemblies. Referring to FIG. 1, the continuous tubular member 10 is shaped to distribute the stresses in the crank set uniformly and equally throughout. This design distributes structural stresses uniformly along the thin-wall 20 of the continuous tubular member 10, from the pedal axle insert 80, down the crank arm 40, across the crank axle, to the spider 60 holding the chain gears (not shown). The spider 60 reinforces the drive side continuous tubular member 10, since it is an integral part of it. Fabricating the spider 60 out of tubular sections also minimizes the weight.

As a further advantage, the use of standard-thread, solid core reinforcing inserts 80 allows the mounting of a variety of sophisticated pedals with little additional weight. The two continuous tubular members 10 are further designed for practical and easy installation on a bicycle. By splitting the crank set midway along the crank axle in a precise manner, easy installation is achieved while maintaining structural integrity. The convoluted split 12 of the continuous tubular members 10 allows transmission of the torque from one side of the crank set to the other side of the crank set without stress concentration at the central joint.

Although the crank set can be fabricated from a host of materials, the crank set is preferably fabricated of materials oriented to make full use of their ultimate strength. In one embodiment, the material is an aramid fiber composite. In another embodiment, the material is a carbon and glass fiber composite. In yet another embodiment, the continuous tubular members 10 are steel stamped parts, made into clamshells and electron beam or laser welded together.

The tapered design of the continuous crank arm 40 of the present invention requires approximately two-thirds of the material of a non-tapered crank arm (i.e. a straight crank arm requires nearly twice as much material as the crank arm of the present invention). Further, the tapered crank arm can carry the same load as a straight crank arm. Therefore, structural performance is maintained while weight is significantly decreased.

Figure 3:
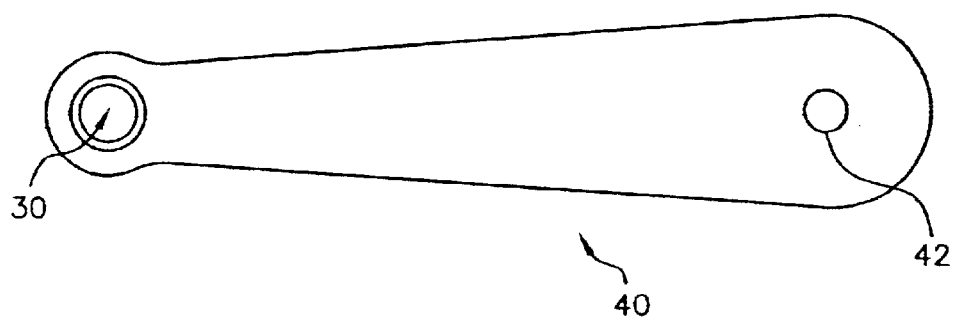
FIG. 3 illustrates a right side elevation view of the crank set housing shown in FIG. 1, showing a tubular crank arm.
Figure 9:
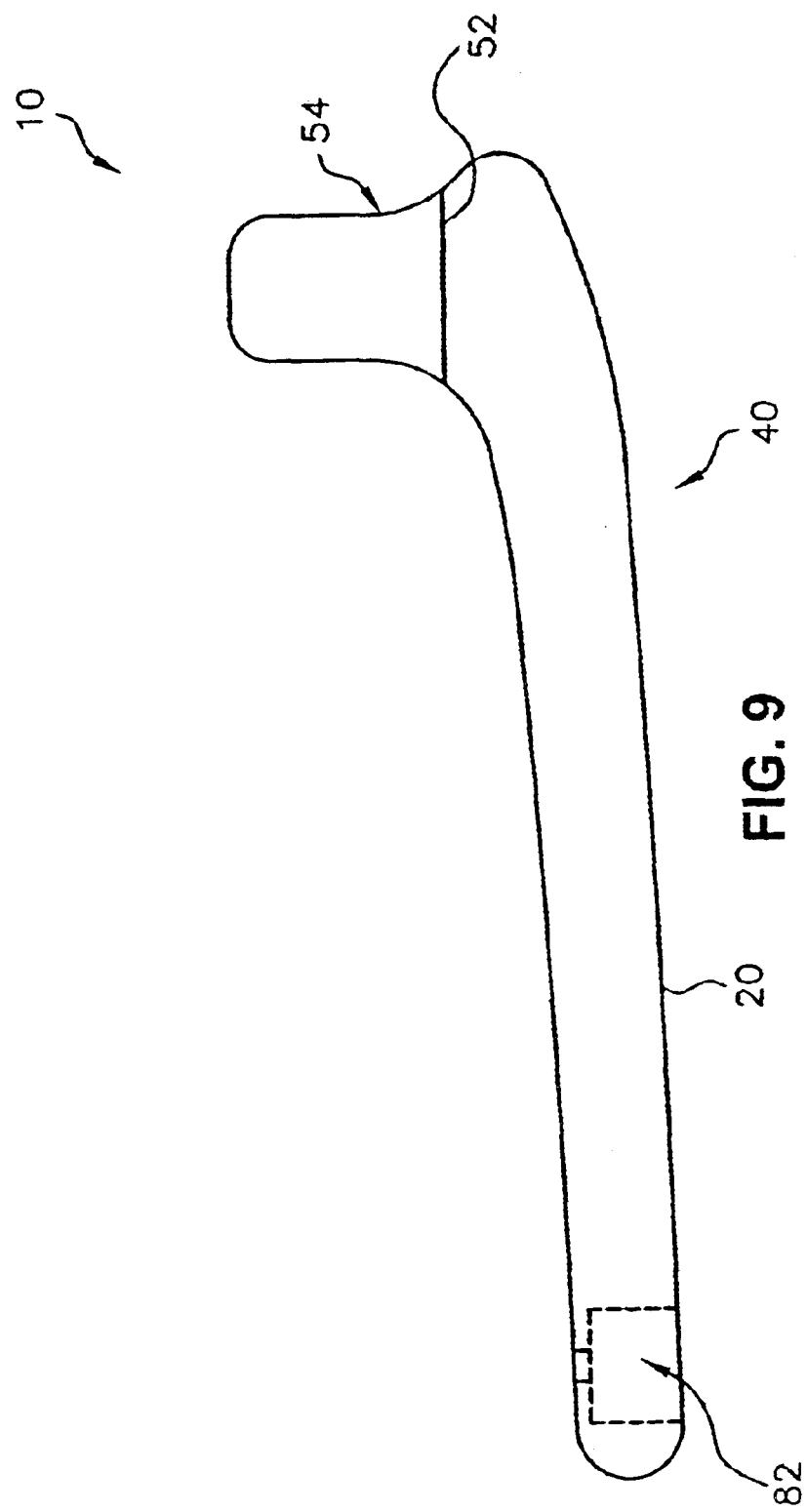
FIG. 9 illustrates a top plan view of another embodiment of the tubular member shown in FIG. 3, including a crank arm, a portion of a crank axle and a reinforcing insert aperture, in accordance with the present invention.

Another embodiment of a one piece, monolithic and continuous tubular member 10 begins with FIG. 9. FIG. 9 illustrates a monolithic and continuous thin-wall tubular member 10 (alternative to that in FIG. 3) including a crank axle 54, a crank arm 40 and a pedal axle reinforcing insert aperture 82. The tubular member 10 can be made of a composite material having thin-wall 20 construction, such as aramid fiber composites or carbon and glass fiber composites. Alternatively, the tubular member 10 can be steel stamped parts of clamshell design, electron beam or laser welded to together. The composite embodiment is injection molded and is literally a one-piece, continuous and monolithic tubular member. The steel embodiment, although steel stamped and welded together, is continuous and monolithic nonetheless, as the tubular member 10 has no discontinuities in form, no mechanical junction (connection) points, and no reinforcing gussets. The continuous and monolithic design of either the composite or steel embodiment minimizes weight without sacrificing strength and rigidity.

Figure 4:
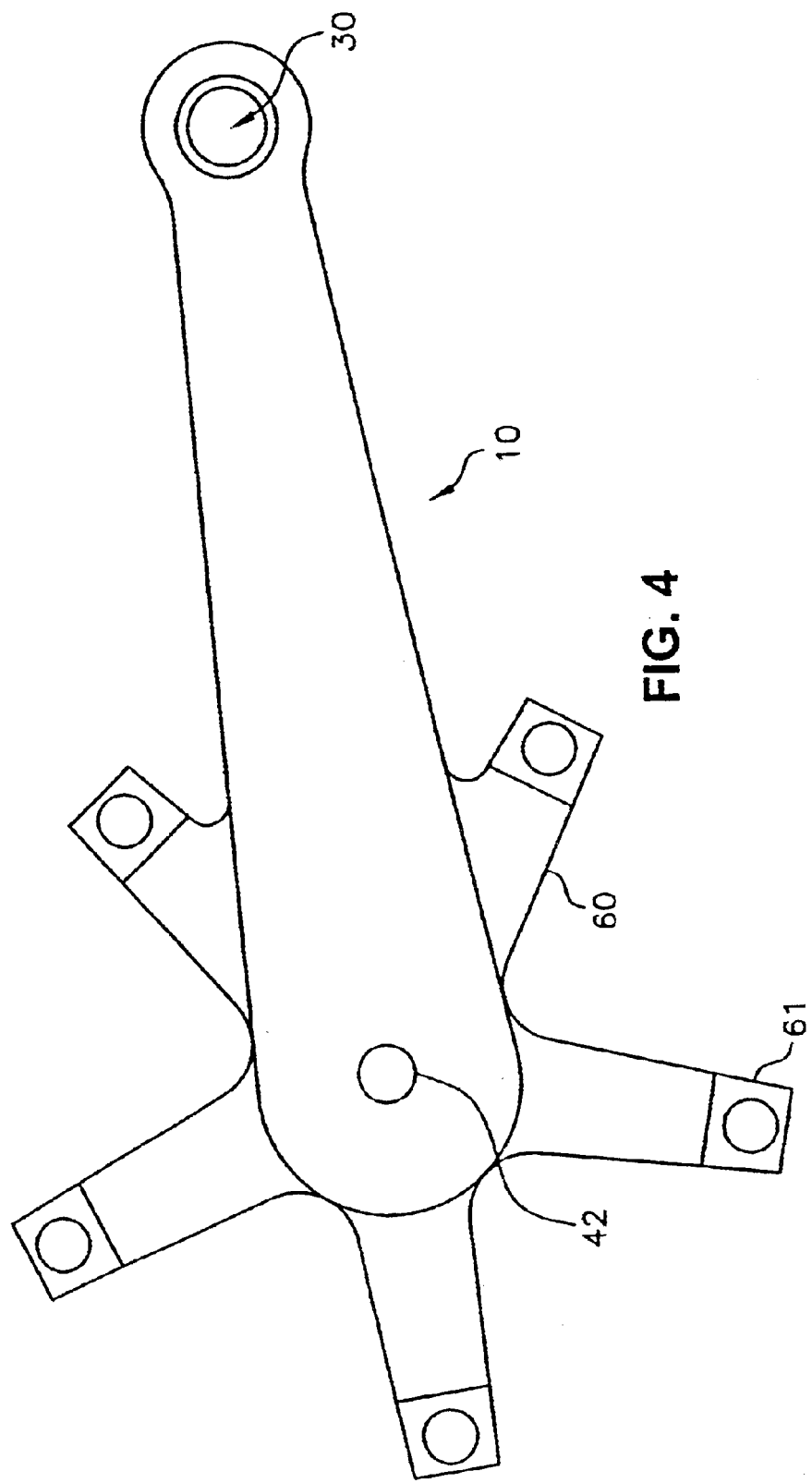
FIG. 4 illustrates a left side view of the crank set housing shown in FIG. 1, showing a tubular crank arm with connected spider.
Figure 10:
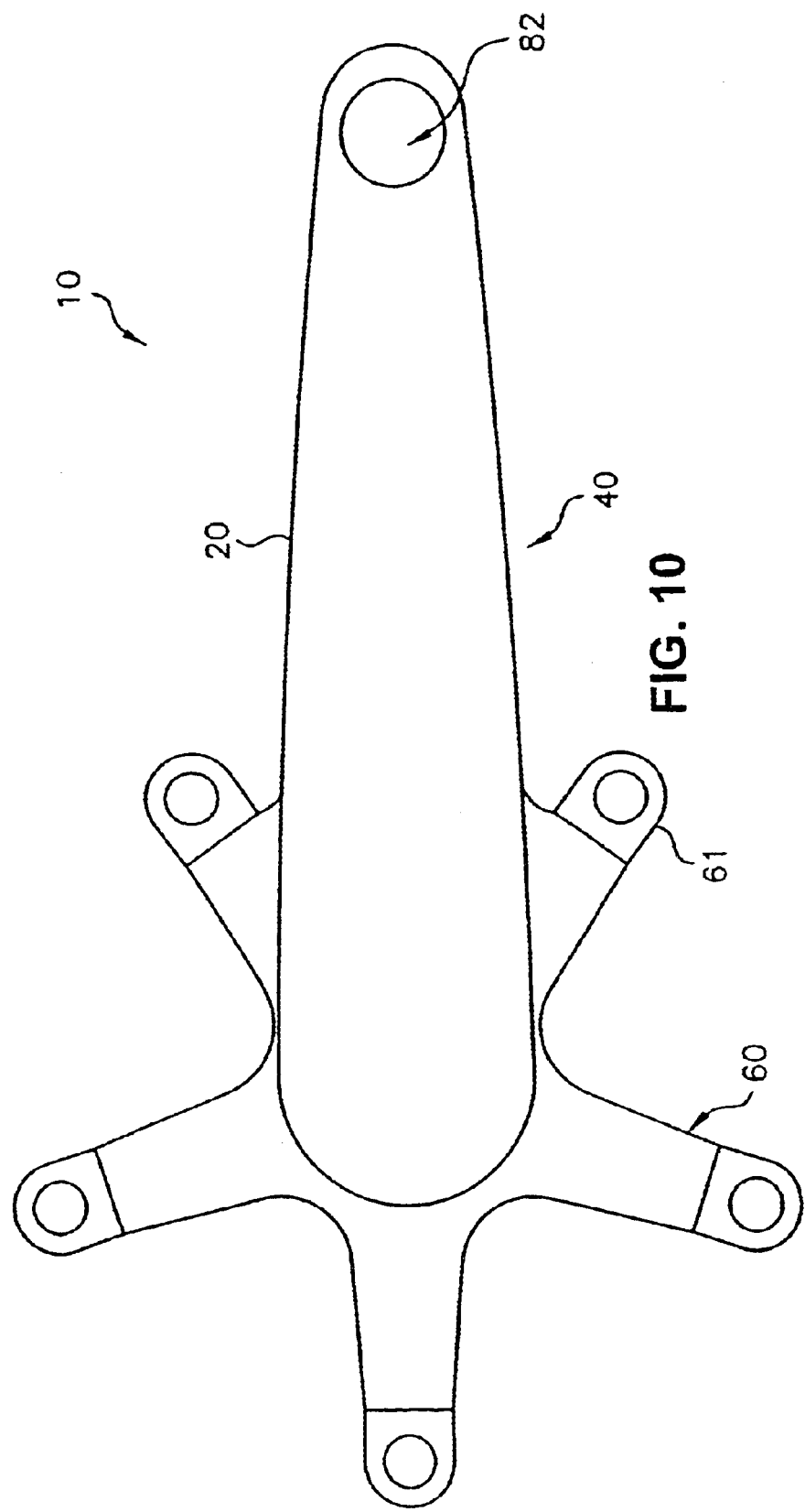
FIG. 10 illustrates a side plan view of another embodiment of the tubular member with connected spider shown in FIG. 4, in accordance with the present invention.
Figure 11:
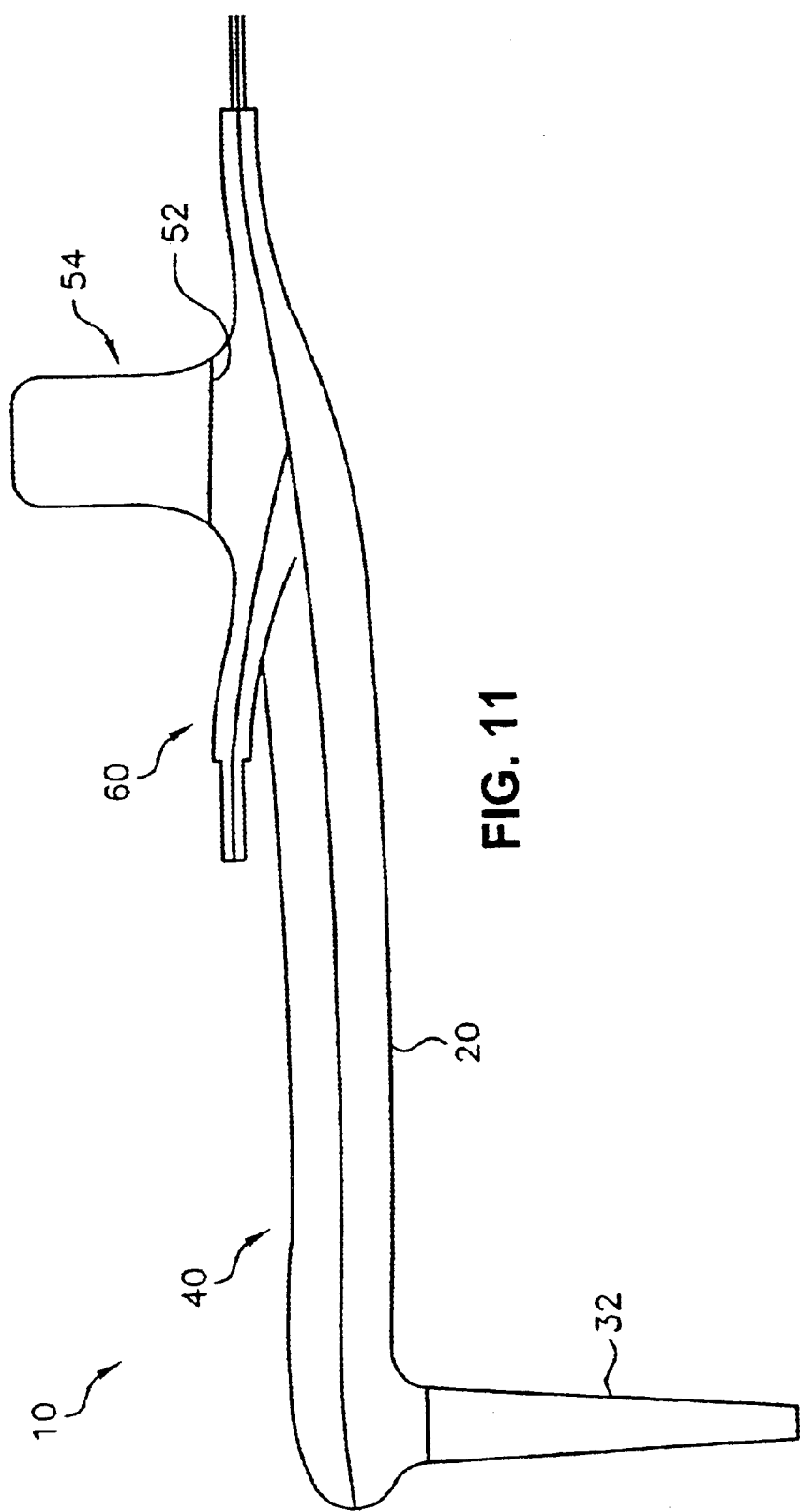
FIG. 11 illustrates a top plan view of an alternative embodiment of the tubular member with connected spider shown in FIG. 4, including a crank arm, a portion of a crank axle, a spider and a pedal axle, in accordance with the present invention.

FIG. 10 illustrates a side elevation of another embodiment of a drive-side continuous tubular member 10 (alternative to that in FIG. 4), showing a spider 60, a crank arm 40 and a pedal axle reinforcing insert aperture 82. FIG. 11 illustrates a plan view of another embodiment of the drive-side continuous tubular member 10 shown in FIG. 10, showing a crank axle 54, a spider 60, a crank arm 40 and a pedal axle 32. The drive-side tubular member 10 can also be made of a composite material having thin-wall 20 construction, or steel stamped welded parts, and incorporates the pedal axle 32 into the continuous one-piece monolithic construction.

The spider 60 includes sprocket tangs 61 to connect the chain gear (not shown). In the composite embodiment of the drive-side tubular member 10, the area of the spider 60 in the vicinity of each sprocket tang 61 is solid and capably withstands the loads imposed by the chain gear. In the steel stamped embodiment of the drive-side tubular member 10, the sprocket tang 61 is hollow and is formed as an integral part of the clamshells.

Figure 12:
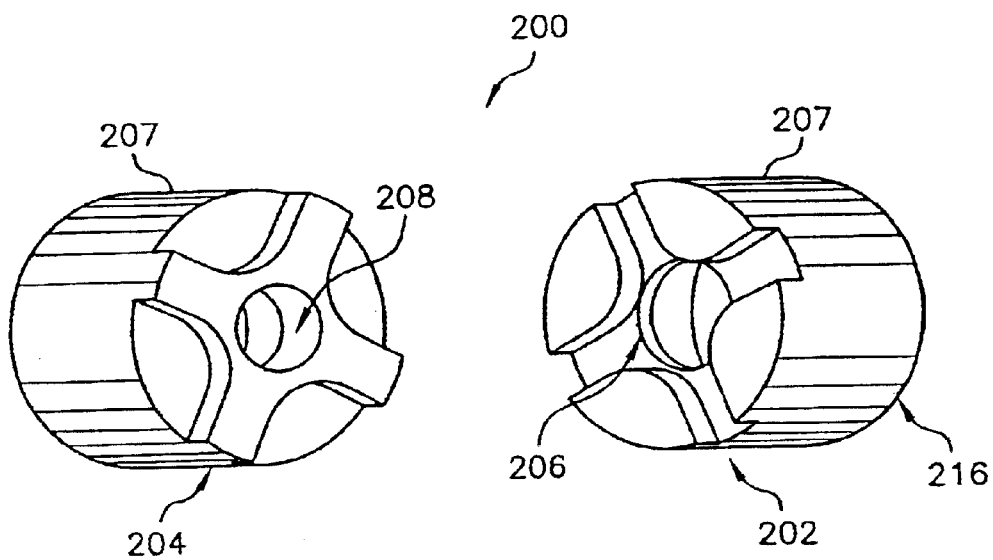
FIG. 12 illustrates an exploded and perspective view of an interference fit coupling, including a mortise member and a tenon member, in accordance with the present invention.

FIG. 12 illustrates an interference fit coupling 200 having a mortise member 202 and a tenon member 204. The mortise and the tenon members 202, 204 are made of steel and each include cylindrical, tubular walls 207 terminating with a flared tip 216 arrangement (the flared tip arrangement is better illustrated in FIG. 14). The mortise and the tenon members 202, 204 are cylindrically sleeved over the crank axle 54 portions of the tubular members 10 to form a crank axle extending from each tubular member 10 of the crank set 8 equal to exactly one-half of the total crank axle length of the crank set 8. A line 52, shown in each of FIGS. 9 and 11, illustrates the extent that the flared tip 216 arrangement of the mortise or the tenon members 202, 204 extends over (is sleeved over) the crank axle 54 portions of each tubular member 10. A 0.009 inch to 0.011 inch thick layer of high strength epoxy structural adhesive, such as 3M DP-420, can be used to attach the mortise or the tenon member 202, 204 to the crank axle portion 54 of the tubular member.

Figure 14:
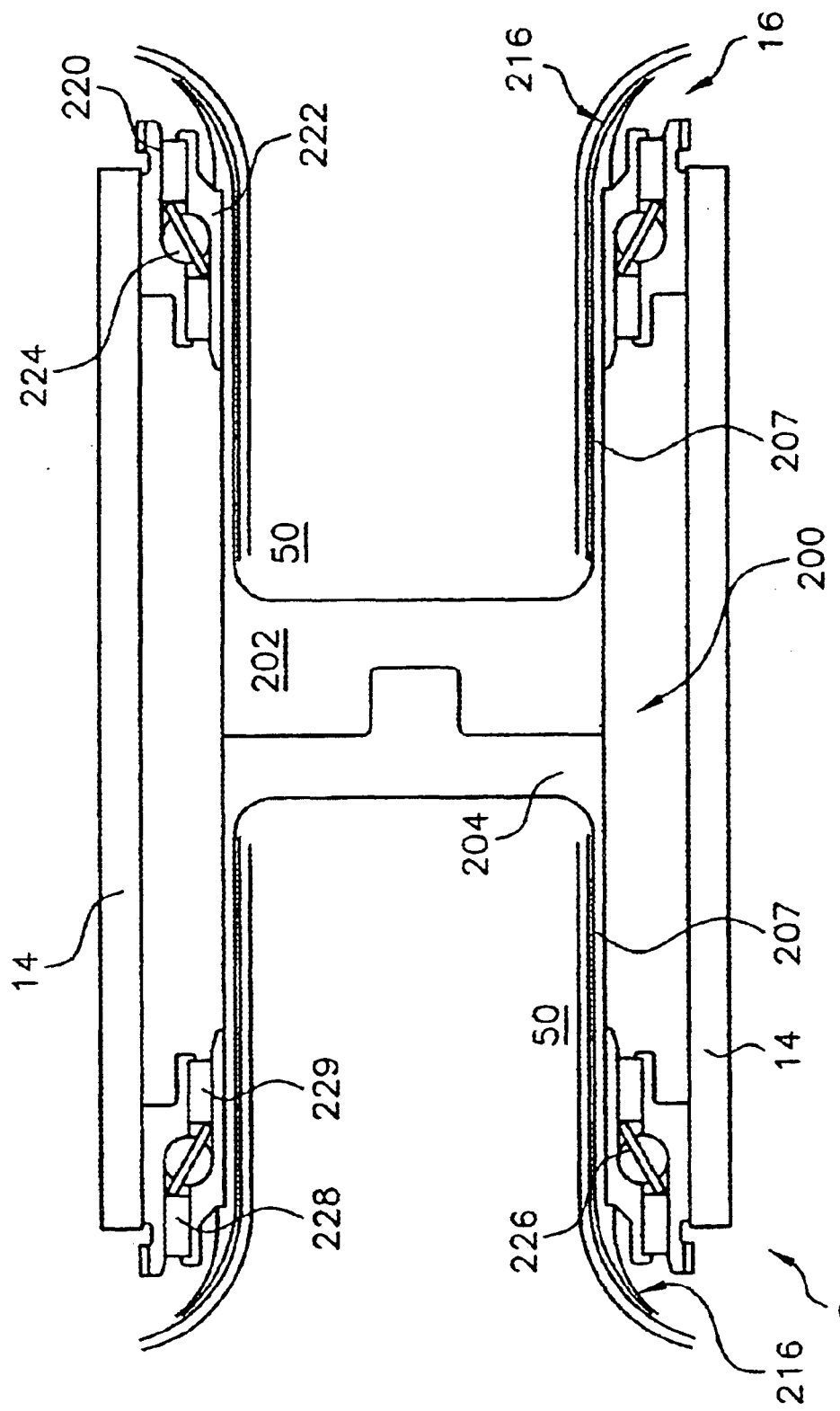
FIG. 14 illustrates a top, cross-sectional detailed view of an interference fit coupling centered between two bearing sets within a bracket shell, in accordance with the present invention.
Figure 18:
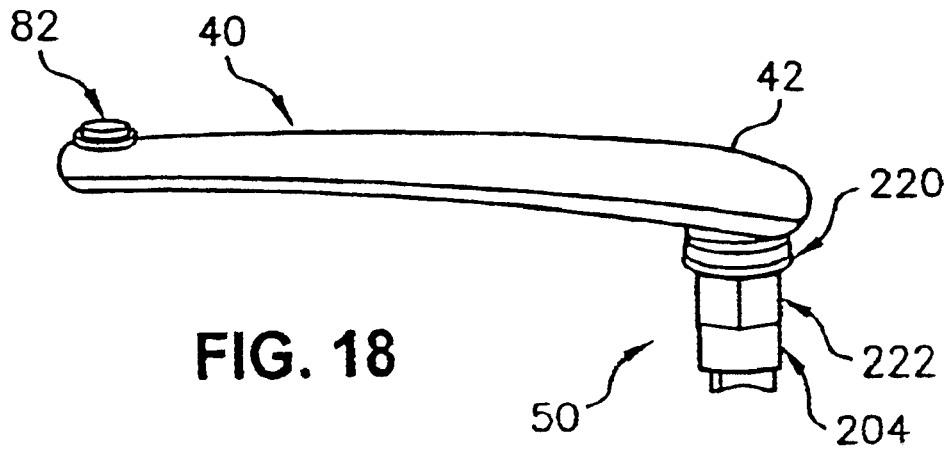
FIG. 18 illustrates a perspective view of the tubular member shown in FIG. 9, with a tenon member of an interference coupling attached to the tubular member (also having an inner cup with integral outer seal press fit onto the tenon member), in accordance with the present invention.
Figure 19:
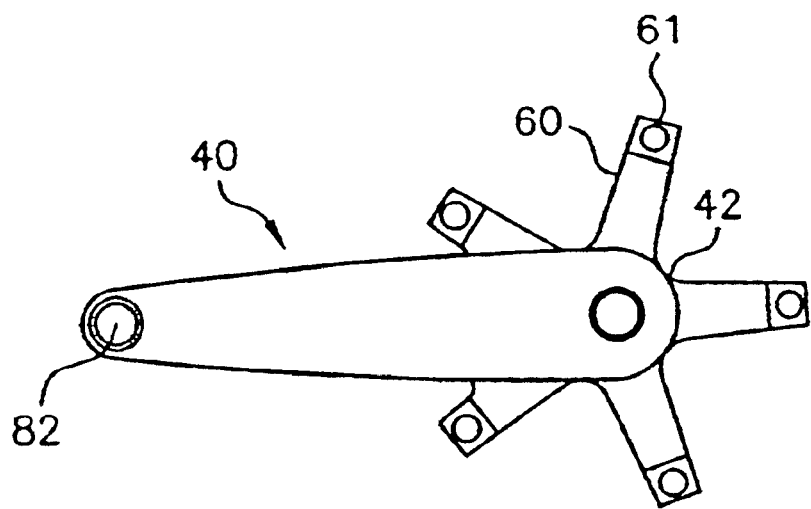
FIG. 19 illustrates a side plan view of the tubular member with connected spider shown in FIG. 10, further showing a tab covering an access hole for coupling assembly and disassembly, in accordance with the present invention.
Figure 20:
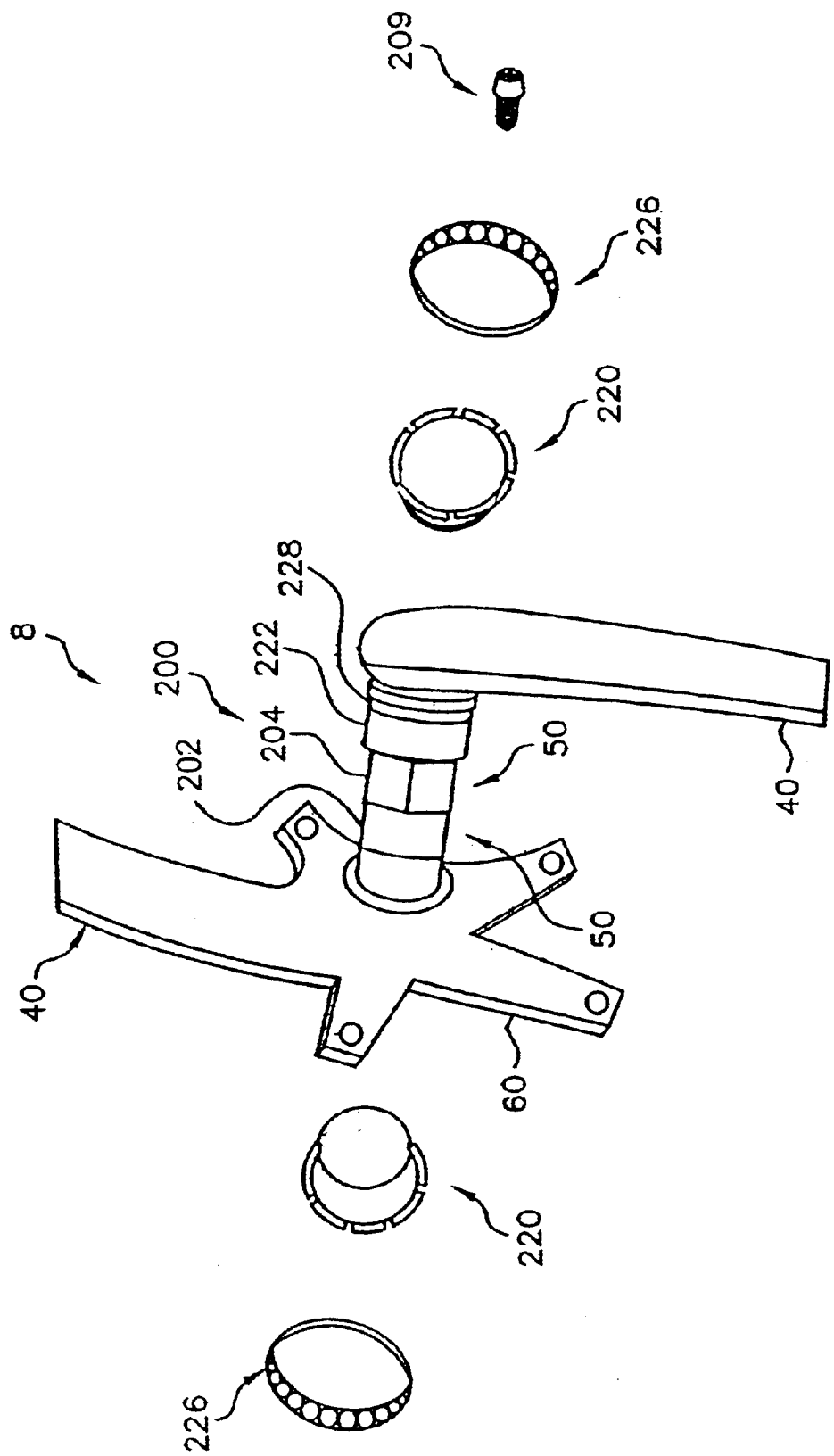
FIG. 20 illustrates a perspective, exploded view of a crank set assembly with an interference fit coupling, in accordance with the present invention.

The one-half crank axle 50 portions of the tubular members 10 (as shown in FIGS. 18 and 20), which include the mortise 202 or the tenon 204 member sleeved over the crank axle 50 portion of the tubular member 10, are non-tapered and align opposing crank arms 40 180° from each other. FIGS. 18 and 20 also illustrate an outer cup 220 and an inner seal 229 press fit onto the one-half crank axle portion 50. The interference fit coupling 200 effectively transmits all torque and bending moments across the coupling 200, as the central location of the coupling 200 (between the two bearing sets 16, as shown in FIG. 14) within the bracket shell 14 eliminates all shear loads. The interference fit coupling 200, therefore, avoids any undesirable backlash or play in the crank set 8 due to high loads or wear.

Figure 13:
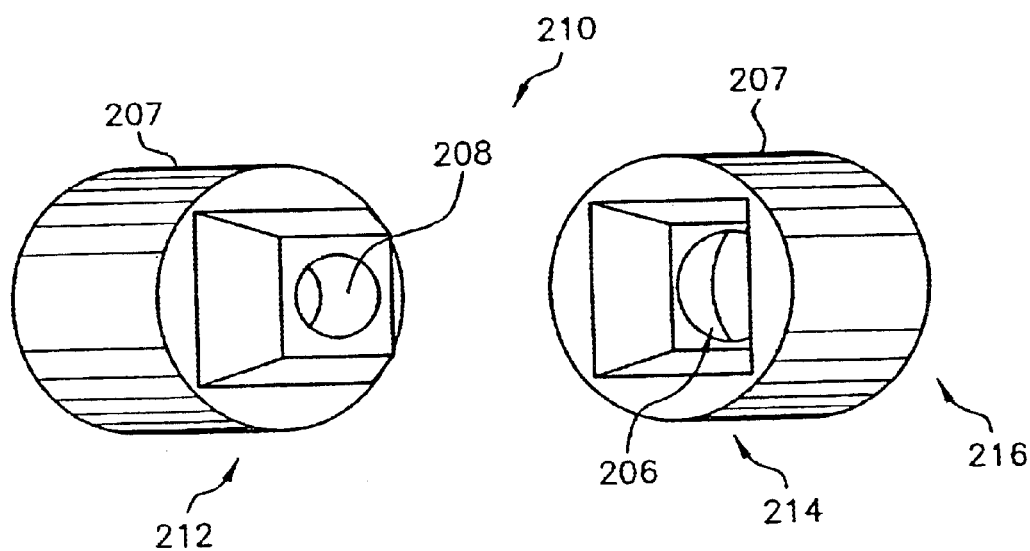
FIG. 13 illustrates an exploded and perspective view of a tapered four coupling, including a male member and a female member, in accordance with the present invention.

FIG. 13 illustrates a tapered four coupling 210 having a male tapered four member 212 and a female tapered four member 214. The male and female members 212, 214 each have four tapered sides, each having equal surface area. The tapered four coupling 210 is made of steel and each member 212, 214 includes a cylindrical, tubular wall 207 terminating with a flared tip 216 arrangement. Similar to the interference fit coupling 200, the male and the female members 212, 214 are cylindrically sleeved over and adhered to the crank axle 54 portions of the tubular members 10 to form a crank axle extending from each tubular member 10 of the crank set 8 equal to exactly one-half of the total crank axle length of the crank set 8. The line 52, shown in each of FIGS. 9 and 11, also illustrates the extent that the flared tip 216 arrangement of the male and the female tapered four members 212, 214 extend over (are sleeved over) the crank axle 54 portions of each tubular member 10.

The tapered four coupling 210 also aligns opposing crank arms 40 180° from each other and effectively transmits all torque and bending moments across the coupling 210, as the central location of the coupling 210 (between the two bearing sets 16) eliminates all shear loads.

The interference fit coupling 200 and the tapered four coupling 210 distributes all loads across the point of attachment of the one-half crank axle portions 50 in a uniform and seamless fashion. The flared tip arrangement 216 minimizes any uneven stress distribution. The sleeved coupling 200, 210 design also facilitates the distribution of bearing loads over a greater area, minimizing concentrated loads on the tubular member 10. Concentrated loads on the tubular members 10 must be minimized if the tubular members 10 are to be made of composite materials.

The interference fit coupling 200 is superior to splined, or even the tapered four coupling 210, due to a more economical and simpler fabrication process. The tapered four coupling 210 is cast, forged or stamped and then requires significant machining before use. The interference fit coupling 200 can be machined from a standard milling machine and used immediately. Other couplings also require refinement, or a higher level of machining, after initial fabrication. The interference fit coupling 200 is extremely rugged; overtightening during assembly will cause no damage.

For assembly and disassembly purposes, the interference fit coupling 200 and the tapered four coupling 210 include a clearance hole 206 within one crank axle 50 portion, and an attachment hole 208 within an opposite crank axle 50 portion. The clearance hole 206 has a larger diameter than the attachment hole 208. The clearance hole and the attachment holes are interiorly threaded.

Figure 17:
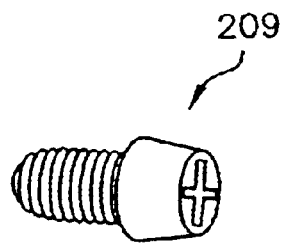
FIG. 17 illustrates a perspective view of an attachment bolt for an interference fit coupling or tapered four coupling, in accordance with the present invention.

To assemble the interference fit coupling 200 or the tapered four coupling 210, a threaded attachment bolt having a diameter equal to that of the attachment hole 208 can be placed through the clearance hole 206 and into the attachment hole 208. Threading the attachment bolt 209 (shown in FIG. 17) into the attachment hole 208 draws the mortise 202 and the tenon 204 members (or the male and the female members 212, 214 of the tapered four coupling 210) into interlocking engagement, due to a head of the attachment bolt 209 being larger than the diameter of the clearance hole 206. The attachment bolt 209 can be a 4.9 gram titanium Allen head bolt.

It is to be understood, however, that the attachment bolt 209 can be used to facilitate coupling assembly (the pulling together of either the mortise and the tenon members 202, 204 of the interference fit coupling 200 or the male and the female tapered four members 212, 214 of the tapered four coupling 210). The attachment bolt 209 is not necessary to hold the respective members of the interference fit coupling 200 or the tapered four coupling 210 together during crank set 8 use. The attachment bolt 209 can be removed after coupling 200, 210 assembly.

Removal of a tab 42 (shown in FIGS. 1, 2, 3, 4, 18 and 19) provides access to the coupling (whether the sleeved coupling 100, the interference fit coupling 200, or the tapered four coupling 210 is being used) within the bracket shell 14 for coupling assembly and disassembly (for operation of the threaded stud 150 or for installation/removal of the attachment bolt 209 or separation bolt). The tab 42 is titanium, is press fit within a recess in the crank arm 40, and contains a double O-ring to seal out contaminants.

To disassemble the interference fit coupling 200 or the tapered four coupling 210, the attachment bolt 209 is removed and a threaded separation bolt (not shown) having a diameter equal to that of the clearance hole 206 is threaded into and through the clearance hole 206 until an end of the separation bolt forces the tenon member 204 out of engagement with the mortise member 202, or the male tapered four member 212 out of engagement with the female tapered four member 214. Alternatively, the attachment bolt 209 can be threaded through the attachment hole 208 while the separation bolt is threaded through the clearance hole 206 so that an end of each bolt meet within the coupling 200, 210. Turning one, or both bolts against the end of the other bolt will also separate the mortise member 202 from the tenon member 204, or the male tapered four member 212 from the female tapered four member 214. Using both the attachment bolt 209 and the separation bolt for disassembly insures that no marring or crushing occurs to the interlocking members of the interference fit coupling 200 or the tapered four coupling 210.

The interference fit coupling 200 and the tapered four coupling 210 are preferably fabricated from ultra-high strength, corrosion resistant metal having outstanding fatigue properties and high toughness. In one embodiment of the invention, 17-4 PH is used, an age hardened stainless steel. 17-4 PH steel can be hardened to yield strengths over 200,000 psi (standard steels have a strength of 60,000 psi). 17-4 PH steel has incredible toughness, corrosion resistance and fatigue strength.

FIG. 14 illustrates a top, cross-sectional detail view of an interference fit coupling 200 centered between two bearing sets 16 within a bracket shell 14. Each bearing set 16 includes an outer cup 220, an inner cup 222, ceramic balls 224, a retaining ring 226, an outer seal 228 and an inner seal 229.

Figure 15:
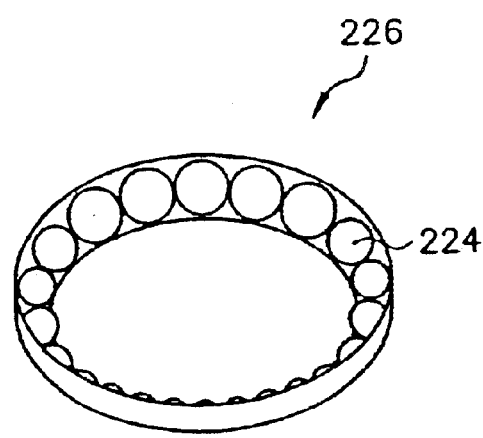
FIG. 15 illustrates a perspective view of a retaining ring with ball bearings of a bearing set, in accordance with the present invention.
Figure 16:
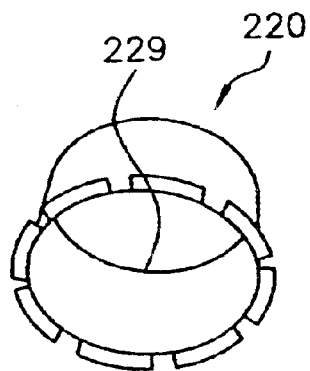
FIG. 16 illustrates a perspective view of an outer cup with integral inner seal of a bearing set, in accordance with the present invention.

In one embodiment of the present invention, the ceramic balls 224 are 3.2 mm silicon nitride. The outer and the inner cups 220, 222 (the outer cup 220 is shown in FIG. 16) are 52100 steel and are hardened to approximately Rockwell 60. The cups 220, 222 are then sputer coated with titanium aluminum nitride, giving the cups 220, 222 a hardness of over Rockwell 90. In addition to extreme hardness, the sputer coating enhancing the lubricity of a surface of the cups 220, 222 and provides corrosion resistance. The retaining ring (shown in FIG. 15) can be mylar, nylon, Delrin, or any engineering plastic capable of separating the ceramic balls 224 and preventing ball on ball grinding. The seals 228, 229 (the inner seal 229 is shown in FIG. 16 as an integral part of the outer cup 220) are spring loaded Teflon garter seals, offering 25 to 50 times more pressure on the crank axle than rubber lip seals while having less retarding torque. Similarly, the outer seal 228 is formed as an integral part of the inner cup 222.

Referring to FIG. 20, assembling the crank set 8 within the bracket shell 14 is accomplished as follows: the outer cups 220 with integral inner seals 229, housing the retaining ring 226 and ceramic balls 224, are threaded into the bracket shell 14; the one-half crank axle 50 portions of the tubular members 10 (with the inner cups 222 and integral outer seals 228) are inserted into each end of the bracket shell 14 (within the outer cups 220 and the retaining rings 226); the interference fit coupling 200 is mated (using the attachment bolt 209 if desired); and, the outer and the inner cups 220, 222 of the bearing sets 16 are slightly separated to pre-load the bearing sets 16 (taking any play out of the crank set 8). Either the outer or the inner cup 220, 222 can be screwed out, providing lateral movement of approximately two to three millimeters in the crank set 8 for adjustment within the bracket shell 14. The assembly process requires no shims or spacers. The outer cups 220 are secured in place with Locktite.

To accommodate standard pedals, the reinforcing insert 80 of the composite embodiment of the crank set 8 is interiorly threaded and made of titanium. The reinforcing pedal axle insert 80 is either molded or epoxied in place within the reinforcing insert aperture 82 of the crank arms 40. An area of the composite crank arm 40 (in the vicinity of the aperture 82) is made of solid carbon fiber and glass composite and is compression molded. The hollow sections of the crank arm 40 can either be compression molded around a Styrofoam plug or bladder molded with a custom shaped nylon bladder, or a straight latex bladder. In the steel version of the crank set 8, the reinforcing insert 80 is machined separately and welded in place either at the end of the crank arm 40 or through the crank arm 40. No additional material, such as gussets, surrounds the reinforcing insert 80.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention.

What is claimed is:

1. A bicycle crank set comprising:
   a. a pair of hollow L-shaped tubular members, each being of unitary construction and having one-piece continuous walls, each of said members comprising:
      i. a first leg having respective first and second closed ends;
      ii. a second leg joining said first leg at a position between the axial midpoint of said first leg and a second end of said first leg, said second leg having an open end remote from position of juncture with said first leg;
      iii. interiors of said legs of respective tubular members being in open communication with each other;
      iv. first closed ends of said L-shaped tubular members being rounded;
      v. a second one of said tubular members having a spider integrally formed therein as a part of said one-piece continuous wall, proximate said second closed end, coaxially with said second leg of said second tubular member, said spider being adapted for driving engagement with a conventional bicycle drive chain;
      vi. said members being adapted for coaxial interfitting joining at convoluted open ends of respective second legs for unitary rotation about a common axis of said second legs; and
   b. releasable means for clampingly securing said second legs for said unitary rotation when said convoluted open ends are matingly engaged, comprising:
      i. an outer sleeve surrounding said matingly engaged second legs;
      ii. a radially expandable inner sleeve positioned within said matingly engaged second legs, including an axially tapered interior surface, adapted to expand outwardly against inner annular surface of said second legs and urging said second legs outwardly into tight fitting contact with said outer sleeve;
      iii. a threaded stud coaxially located within said inner sleeve;
      iv. externally axially tapered bushing means threadedly engaging said stud and axially slidably contacting the interior of said inner sleeve upon rotational axial movement of said bushing along said stud;

wherein rotation of said stud results in bushing axial movement therealong moving said inner sleeve radially outwardly against annular interior surfaces of said second legs, urging said second legs outwardly into tight fitting contact with said outer sleeve and sandwiching said second legs therebetween for unitary rotation one with another.

2. A bicycle crank set, comprising:
  a. a first tubular member having an exterior and an interior surface;
  b. a second tubular member having an exterior and an interior surface;
  c. a spider integrally connected to and forming a part of the second tubular member about the exterior thereof;
  d. a coupling comprising an outer sleeve and an inner sleeve, securing the first tubular member to the second tubular member;
  e. a threaded stud coaxially located within said inner sleeve, wherein said outer sleeve extends along and in contact with said exterior of said first and second tubular members, said inner sleeve extends, substantially parallel and coaxial with said outer sleeve, along and in contact with said interior surface of said first and second tubular members within said first and second tubular members overlying juncture thereof, said inner sleeve including an axially tapered exterior surface adapted to expand radially outwardly against said interior surfaces of said first and second tubular members to urge said contacted portions of said tubular members radially outwardly into tight fitting contact against said outer sleeve.

3. The bicycle crank set of claim 2 further comprising said tubular members having respective integrally formed hollow cylindrical half crank axle portions coaxially oriented with one another and extending transversely from respective tubular members, mutually facing extremities of said cylindrical portions matingly convolutedly engaging one another for torque transfer therebetween upon crank set rotation around the axis about which said hollow cylindrical half crank axle portions are coaxially oriented.

4. The crank set of claim 2, wherein the first and the second tubular members include:
  a. a crank arm; and
  b. a crank axle portion, the crank arm and the crank axle portion being a continuous, monolithic thin-wall structure.

5. The crank set of claim 4, wherein the first and the second tubular members further include a pedal axle, the crank arm of the crank axle portion and the pedal axle forming a continuous, monolithic thin-wall structure.

6. The crank set of claim 5, wherein the spider is integrally incorporated into the continuous, monolithic thin-wall structure of the second tubular member.

7. The crank set of claim 6, wherein the crank axle portion is precisely one-half of total crank axle length of the crank set.

8. The crank set of claim 6, wherein the crank arms taper.

9. The crank set of claim 8, wherein the tapered crank arms further comprise elliptical cross-sections to distribute stresses uniformly and equally over length of the crank arm.

10. The crank set of claim 9, wherein the first and second tubular members are injection molded of aramid fiber composite.

11. The crank set of claim 9, wherein the first and second tubular members are injection molded of carbon and glass fiber composite.

12. The crank set of claim 9, wherein the first and second tubular members are steel-stamped parts of clamshell design electron beam or laser welded together to form a continuous, monolithic thin-wall tubular shape.

13. The crank set of claim 2, wherein the connection between the first and the second tubular member includes interlocking an end of the crank axle portion of the first and the second tubular members, the end of the crank axle portions having a convoluted split configuration.

* * * * *